United States Patent [19]

Ophir

[11] Patent Number: 4,627,952
[45] Date of Patent: Dec. 9, 1986

[54] INJECTION MOLDING PROCESS
[75] Inventor: Zohar Ophir, Haifa, Israel
[73] Assignee: Celanese Corporation, New York, N.Y.
[21] Appl. No.: 689,326
[22] Filed: Jan. 7, 1985

Related U.S. Application Data

[63] Continuation-in-part of Ser. No. 414,558, Sep. 3, 1982, abandoned.
[51] Int. Cl.$^4$ .............................................. B29C 45/76
[52] U.S. Cl. ................................. 264/328.12; 264/37
[58] Field of Search .................. 264/37, 328.7, 328.12; 425/555, 557, 558, 559

[56]  References Cited

U.S. PATENT DOCUMENTS 2,803,043  8/1957  Stephens ......................... 264/331.11
3,016,574  1/1962  Fischer et al. .................... 264/328.7
4,008,031  2/1977  Weber ................................. 264/2.2
4,083,829  4/1978  Calundann et al. .
4,299,756  11/1981  Calundann .

OTHER PUBLICATIONS

Rheology of Polymers, E. T. Severs, Reinhold Pub. 1962, pp. 126-127.

Primary Examiner—Jan Silbaugh
Attorney, Agent, or Firm—Burns, Doane, Swecker & Mathis

[57]  ABSTRACT

The present invention provides an improved process for molding thermotropic liquid crystalline polymer, and the apparatus for such process. The process comprises the steps of providing a molten stream of the polymer to be molded; injecting the molten stream into the cavity of the mold; continuously allowing a portion of the melt to flow out of the cavity during the entire filling of the cavity so as to substantially preserve the laminar flow pattern of the melt in the cavity; and solidifying the molten polymer into a molded article. The resulting articles have mechanical properties superior to conventionally molded articles.

18 Claims, 3 Drawing Figures

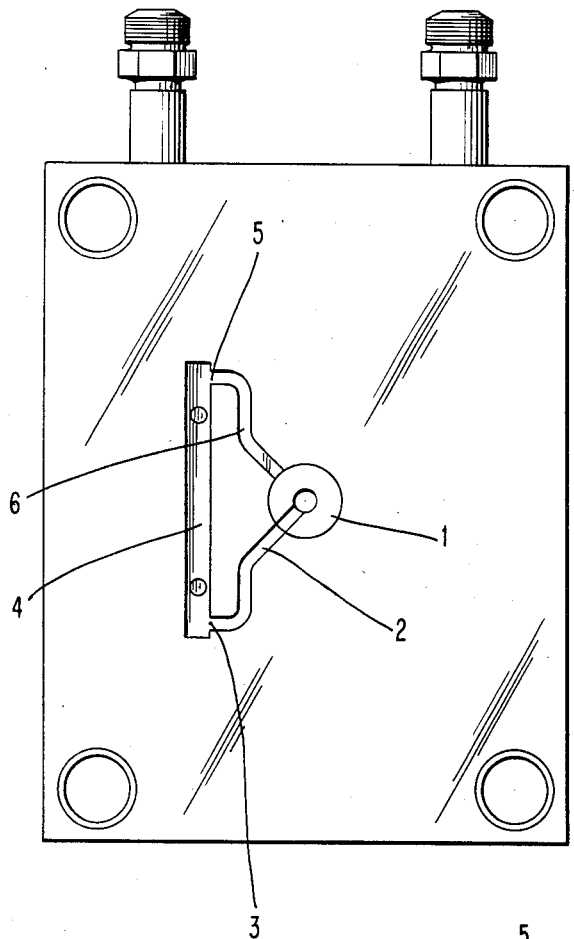
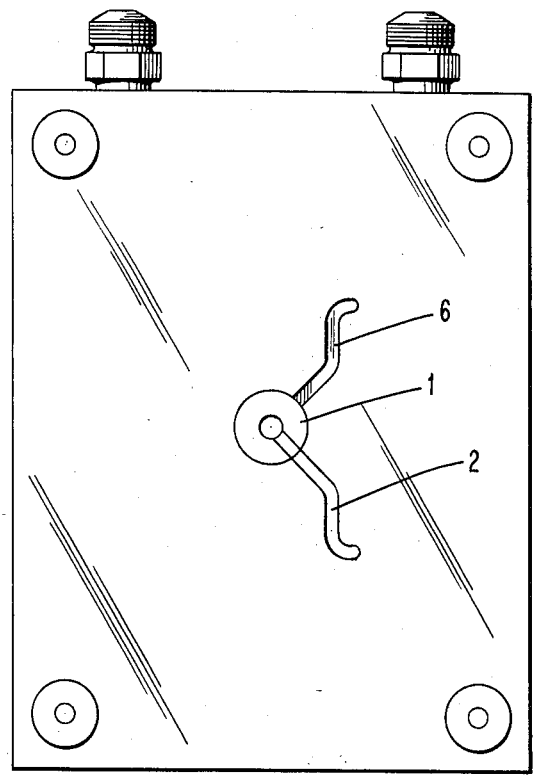
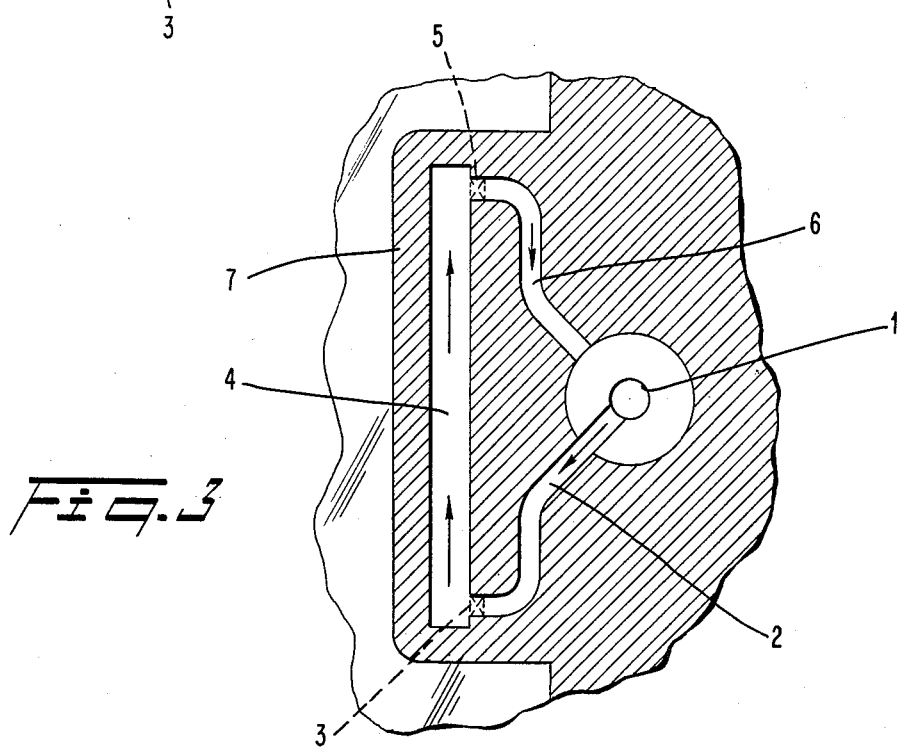

INJECTION MOLDING PROCESS

CROSS-REFERENCE TO RELATED APPLICATIONS

This is a continuation-in-part of application Ser. No. 414,558, filed Sept. 3, 1982, now abandoned.

BACKGROUND OF THE INVENTION

The present invention provides an improved process and apparatus for the injection molding of liquid crystalline polymer. The process produces molded articles having enhanced mechanical properties.

The injection molding of molten thermoplastic polymer is well-known in the art. The conventional method of injection molding is to first inject the polymer melt into the closed mold and, subsequently, to pack additional melt into the cavity to compensate for the densification of the melt during the cooling stage. Conventionally molded articles of liquid crystalline polymer, or other thermoplastics whose mechanical properties are a direct function of their molecular orientation in the molten phase, suffer from low tensile strength in the far or "dead-end" zone of the mold cavity where the melt layers begin to pack. It is in the "dead-end" zone of the mold cavity where the laminar flow of the polymer in the mold cavity strikes the wall of the cavity and reverses its flow direction upon packing. This substantial interruption with laminar flow results in rebound wave patterns on a molecular scale in the melt with concomitant points of structural weakness.

In contrast, the molded articles produced by the apparatus and process of the present invention exhibit enhanced mechanical properties due to the laminar flow orientation of the polymer molecules substantially throughout the molded article.

According to the process of the present invention, articles having improved properties due to the minimization of rebound molecular wave motion (i.e. patterns) within the mold cavity can be formed by allowing the laminar flow of molten polymer to continuously exit through the heretofore dead-end of the injection mold while the mold's cavity is being filled.

Therefore, it is an object of the present invention to provide an improved process for injection molding thermotropic liquid crystalline polymer to form molded articles with enhanced mechanical properties.

It is also an object of the present invention to provide an improved process for injection molding thermotropic liquid crystalline polymer to form molded articles having their constituent polymer molecules oriented in laminar fashion substantially throughout the article.

It is also an object of the present invention to provide an apparatus for the injection molding of thermotropic liquid crystalline polymer to form molded articles with enhanced mechanical properties.

It is also an object of the present invention to provide an apparatus for the injection molding of thermotropic liquid crystalline polymer to form molded articles having their constituent polymer molecules substantially oriented in laminar fashion throughout the article.

It is also an object of the present invention to provide an improved article molded from thermotropic liquid crystalline polymer with enhanced mechanical properties.

It is also an object of the present invention to provide an article molded from thermotropic liquid crystalline polymer wherein the constituent polymer molecules are oriented in laminar fashion substantially throughout the article.

SUMMARY OF THE INVENTION

The present invention provides an improved process for molding thermotropic liquid crystalline polymer and the apparatus for such process. The process comprises the steps of providing a molten stream of the polymer to be molded; injecting said molten stream into the cavity of the mold; continuously allowing a portion of the melt to flow out of the cavity during the entire filling of the cavity so as to substantially preserve the laminar flow pattern of the melt in the cavity by minimizing rebound molecular wave motion within the cavity; and solidifying the molten polymer into a molded article.

DESCRIPTION OF THE DRAWINGS

FIGS. 1 and 2 show the two halves of one embodiment of the injection molding apparatus of the present invention.

FIG. 3 is an expanded schematic representation of one embodiment of the injection molding apparatus which is suitable for use in the process of the present invention. It is described in Example 1.

DETAILED DESCRIPTION OF THE INVENTION

The process and apparatus provided by the present invention relates to the injection molding of liquid crystalline polymer.

Representative classes of polymers from which the thermotropic liquid crystalline polymer suitable for use in the present invention may be selected include wholly aromatic polyester, aromatic-aliphatic polyesters, wholly aromatic poly(ester-amides), aromatic-aliphatic poly(ester-amides), aromatic polyazomethines, aromatic polyester-carbonates, and mixtures of the same. In preferred embodiments the thermotropic liquid crystalline polymer is a wholly aromatic polyester, a wholly aromatic poly(ester-amide), or an aromatic-aliphatic poly(ester-amide). In such wholly aromatic polyester and wholly aromatic poly(ester-amide) each moiety present within the polymer chain contributes at least one aromatic ring. Also, it is preferred that naphthalene moieties be included in the thermotropic liquid crystalline polymer, e.g., 6-oxy-2-naphthoyl moiety, 2,6-dioxynaphthalene moiety, or 2,6-dicarboxynaphthalene moiety, in a concentration of not less than 10 mole percent. The particularly preferred naphthalene moiety for inclusion in the thermotropic liquid crystalline polymer is the 6-oxy-2-naphthoyl moiety in a concentration of not less than about 10 mole percent.

Representative wholly aromatic polyesters which exhibit thermotropic liquid crystalline properties include those disclosed in the following U.S. patents which are herein incorporated by reference: U.S. Pat. Nos. 3,991,013; 3,991,014; 4,66,610; 4,067,952; 4,075,262; 4,083,829; 4,093,595; 4,118,372; 4,130,545; 4,146,702; 4,153,779; 4,156,070, 4,159,365; 4,161,470; 4,169,933; 4,181,792; 4,183,895; 4,184,996; 4,188,476; 4,201,856; 4,219,461; b 4,224,433; 4,226,870; 4,230,816; 4,232,143; 4,232,144; 4,238,598; 4,238,599; 4,238,600; 4,242,496; 4,245,082; 4,245,084; 4,247,514; 4,256,624; 4,265,802; 4,267,304; 4,269,965; 4,279,803; 4,299,756; 4,294,955; 4,318,841; 4,337,190; 4,337,191; and 4,335,134. As discussed hereafter the wholly aromatic polyester of U.S. Pat. No. 4,161,470 is particularly preferred for use in the present invention.

Representative aromatic-aliphatic polyesters which exhibit thermotropic liquid crystalline properties are copolymers of polyethylene terephthalate and hydroxybenzoic acid as discussed in Polyester X-7G-A Self Reinforced Thermoplastic, by W. J. Jackson, Jr., H. F. Kuhfuss, and T. F. Gray, Jr., 30th Anniversary Technical Conference, 1975 Reinforced Plastics/Composites Institute, the Society of the Plastics Industry, Inc., Section 17-D, pages 1–4. A further disclosure of such copolymers can be found in "Liquid Crystal Polymers: I Preparation and Properties of p-Hydroxybenzoic Acid Copolymers", *Journal of Polymer Science, Polymer Chemistry Edition*, Vol. 14, pages 2043 to 2058 (1976), by W. J. Jackson, Jr., and H. F. Kuhfuss. See also U.S. Pat. Nos. 4,318,842 and 4,335,133 which are herein incorporated by reference.

Representative wholly aromatic and aromatic-aliphatic poly(ester-amides) which exhibit thermotropic liquid crystalline properties are disclosed in U.S. Pat. Nos. 4,272,625; 4,330,457; 4,339,375; 4,351,917; 4,351,918; 4,341,688; and 4,355,132, which are herein incorporated by reference. As discussed hereafter the poly(ester-amide) of U.S. Pat. No. 4,330,457 is particularly preferred for use in the present invention.

Representative aromatic polyazomethines which exhibit a thermotropic liquid crystalline property are disclosed in U.S. Pat. Nos. 3,493,522; 3,493,524; 3,503,739; 3,516,970; 3,516,971; 3,526,611; 4,048,148; and 4,122,070. Each of these patents is herein incorporated by reference. As discussed hereafter the poly(ester-amide) of U.S. Pat. No. 4,330,457 is particularly preferred for use in the present invention.

Representative aromatic polyazomethines which exhibit a thermotropic liquid crystalline property are disclosed in U.S. Pat. Nos. 3,493,522; 3,493,524; 3,503,739; 3,516,970; 3,516,971; 3,526,611; 4,048,148; and 4,122,070. Each of these patents is herein incorporated by reference in its entirety. Specific examples of such polymers include poly(nitrile-2-methyl-1,4-phenylenenitriloethylidyne-1,4-phenyleneethylidyne); poly(nitrolo-2-methyl-1,1,4-phenyleneitromethylidyne-1,4-phenylenemethylidyne); and poly(nitrilo-2-chloro-1,4-phenylenenitrilomethylidyne-1,4-phenylenemethylidyne).

Representative aromatic polyester-carbonates which exhibit thermotropic liquid cyrstalline properties are disclosed in U.S. Pat. Nos. 4,107,143 and 4,371,660 which are herein incorporated by reference. Examples of such polymers include those consisting essentially of p-oxybenzoyl units, p-dioxyphenyl units, dioxycarbonyl units, and terephthoyl units.

A thermotropic liquid crystalline polymer commonly is selected for use in the formation of the molded article of the present invention which possesses a melting temperature within the range that is amenable to injection molding while employing commercially available equipment. For instance, thermotropic liquid crystalline polymers commonly are selected which exhibit a melting temperature somewhere within the range of approximately 200° C. to 400° C.

The thermotropic liquid crystalline polymer selected preferably also exhibits an inherent viscosity (I.V.) of at least 2.0 dl./g. when dissolved in a concentration of 0.1 percent by weight in pentafluorophenol at 60° C. (e.g., an inherent viscosity of approximately 2.0 to 15.0 dl./g.).

The particularly preferred wholly aromatic polyester for use in the present invention is that disclosed in U.S. Pat. No. 4,161,470 which is capable of forming an anisotropic melt phase at a temperature below approximately 350° C. This polyester consists essentially of the recurring moieties I and II wherein:

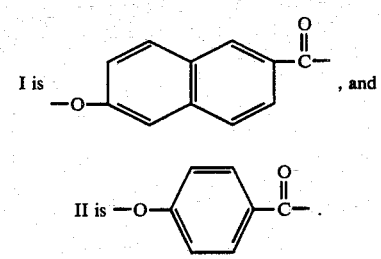

The polyester comprises approximately 10 to 90 mole percent of moiety I, and approximately 10 to 90 mole percent of moiety II. In one embodiment, moiety II is present in a concentration of approximately 65 to 85 mole percent, and preferably in a concentration of approximately 70 to 80 mole percent, e.g., approximately 73 mole percent. In another embodiment, moiety II is present in a lesser proportion of approximately 15 to 35 mole percent, and preferably in a concentration of approximately 20 to 30 mole percent. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof. Such polymer preferably has an inherent viscosity of approximately 3.5 to 7.5 dl./g. when dissolved in a concentration of 0.1 percent by weight in pentafluorophenol at 60° C.

The particularly preferred wholly aromatic poly(ester-amide) or aromatic-aliphatic poly(ester-amide) for use in the present invention is disclosed in commonly assigned U.S. Pat. No. 4,330,457, which is capable of forming anisotropic melt phase at a temperature below approximately 400° C. The poly(ester-amide) there disclosed consists essentially of recurring moieties I, II, III and optionally, IV wherein:

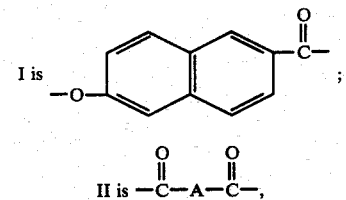

where A is a divalent radical comprising at least one aromatic ring or a divalent trans-1,4-cyclohexylene radical;

III is —Y—Ar—Z—, where Ar is a divalent radical comprising at least one aromatic ring, Y is O, NH or NR, and Z is NH, where R is an alkyl group of 1 to 6 carbon atoms or an aryl group; and IV is —O—Ar'—O—, where Ar' is a divalent radical comprising at least one aromatic ring;

wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof, and wherein said poly(ester-amide) comprises approximately 10 to 90 mole percent of moiety I, approximately 5 to 45 mole percent of moiety II, approximately 5 to 45 mole percent of moiety III, and approximately 0 to 40 mole percent of moiety IV. The preferred dicarboxyl aryl moiety II is:

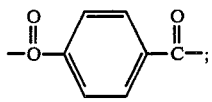

the preferred moiety III is:

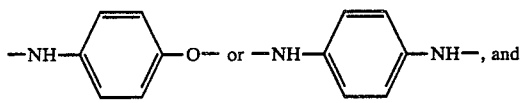

and the preferred dioxy aryl moiety IV is:

When forming the molded article of the present invention, conventional injection apparatus can be used in conjunction with the molding apparatus of the present invention. Suitable injection apparatus include the Stubbe automatic injection molding machine model SKM 50/45.

The temperature and pressure conditions selected for molding the molten thermotropic liquid crystalline polymer will be influenced by the melting temperature of the polymer and its viscosity as will be apparent to those skilled in the art. Typically, injection molding temperatures approximately 5° C. 50° C. above the polymer melting temperature and pressures of approximately 2000 to 20,000 psi are selected.

In the conventional molding of liquid crystalline polymer, melt flows into the cavity in laminar fashion, with each strata in the melt flowing at a uniform rate without substantial inter-strata mixing. When this flow strikes the downstream dead-end of the cavity and rebounds therefrom, laminar flow at this end ceases due to interference from the rebound molecular wave patterns. Since the mechanical properties of molded liquid cyrstalline polymer are directly related to the degree of ordered arrangement of molecules in each strata, this reverse flow causes points of structural weakness in the molded article, detracting from its mechanical properties.

With the present invention, an outlet placed at the downstream end of the cavity allows molten material to continuously flow out of the cavity during filling, thus preventing undesired rebound molecular wave motion (i.e., patterns) within the cavity. In a preferred embodiment, a passage communicates with the downstream outlet so as to receive the molten material.

The present invention also contemplates having the molten material flow into the mold cavity through upstream inlets placed at both ends of the mold with the downstream outlet placed between said inlets. Also, it is within the ambit of the present invention to have the molten material flow into the mold cavity through an upstream inlet located between two downstream outlets. It is further within the ambit of the present invention to provide at least one additional outlet downstream of said inlet (e.g., between said outlet at the downstream end and said upstream inlet) to further modify the flow characteristics of the molten material if desired. It is also possible to provide a plurality of inlets in one end of the mold.

Once the mold article is removed from the mold, the stub of material that solidifies in the passage may be shorn from the article. Articles molded in accordance with the present invention exhibits mechanical properties superior to those of articles molded conventionally.

The mechanical properties of molded articles produced in accordance with the process of the present invention can be improved still further by subjecting the articles to heat treatment following injection molding. The articles may be thermally treated in an inert atmosphere (e.g., nitrogen, argon, helium) or alternatively a flowing oxygen-containing atmosphere (e.g., air). For instance, the article may be brought to a temperature approximately 5° C. to 30° C. below the melting temperature of the liquid crystalline polymer, at which temperature the article remains a solid object. The heat treatment times commonly range from a few minutes to a number of days, e.g., from 0.5 to 200 hours, or more. Preferably, the heat treatment is conducted for a time of 1 to 48 hours (e.g., approximately 24 to 30 hours). The heat treatment improves the properties of the article by increasing the molecular weight of the liquid crystalline polymer and increasing the degree of crystallinity.

The following Examples are given as specific illustrations of the invention. It should be understood, however, that the invention is not limited to the specific details set forth in the Examples.

EXAMPLE 1

Standard ASTM 8.5" tensile bars were molded from the particularly preferred thermotropic liquid crystalline wholly aromatic polyester disclosed in U.S. Pat. No. 4,161,470. The specific polyester employed comprised 70 mole percent 4-oxybenzoyl moiety and 30 mole percent 6-oxy-2-naphthoyl moiety.

The polymer was molded utilizing a conventional injection apparatus with a mold apparatus as illustrated in FIG. 3. The molten polymer was injected into valve 1, and flowed in a substantially laminar fashion into runner 2, through upstream inlet 3 and into the mold cavity 4. To preserve laminar flow substantially throughout the test article, the melt continuously exited the mold cavity 4 through downstream outlet 5 and into passage 6 throughout the filling of the mold cavity 4.

Mechanical properties of the tensile bars produced in accordance with this Example were measured, and the results listed in Table 1.

For purposes of comparison, tensile bars were also molded in the manner described above with the exception that outlet 5 was not opened and mold cavity 4 was packed in the conventional manner. Mechanical properties of these bars were measured and are also listed in Table I.

TABLE I

| Machine | Mold Type | IV | Melt Temp. (°C.) | Mold Temp. (°C.) | Injection Pressure (psi) | Injection Speed | Tensile Strength (psi × 10³) | Tensile Elongation (%) | Tensile Modulus (psi × 10⁶) | Notched Impact Strength (ft-lb/in) |
|---|---|---|---|---|---|---|---|---|---|---|
| Stubbe | Closed-End | 7.7 | 280 | 40 | 6500 | 4 | 27.5 | 3.52 | 1.57 | 11.1 |
| Stubbe | Open-End | 7.7 | 280 | 40 | 6500 | 4 | 34.8 | 3.03 | 2.04 | 21.7 |

The mechanical properties listed in Table I were measured in accordance with standard ASTM Test Nos. D256 and D638.

The data given in Table I indicate the dramatic improvement in mechanical properties of articles molded in the open-end mold of the present invention. This Example thus demonstrates the substantial beneficial effects achieved by the substantial preservation of laminar flow in molding of liquid crystalline polymers.

EXAMPLE 2

Tensile bars produced in accordance with Example 1 were subjected to a heat treatment in a nitrogen atmosphere at 270° C. for 42 hours. Following this heat treatment, the mechanical properties of the bars were measured and are listed in Table II.

TABLE II

| Machine | Mold Type | IV | Melt Temp. (°C.) | Mold Temp. (°C.) | Injection Pressure (psi) | Injection Speed | Tensile Strength (psi × 10³) | Tensile Elongation (%) | Tensile Modulus (psi × 10⁶) | Notched Impact Strength (ft-lb/in) |
|---|---|---|---|---|---|---|---|---|---|---|
| Stubbe | Closed-End | 7.7 | 280 | 40 | 6500 | 4 | 28.7 | 2.68 | 1.68 | 21.8 |
| Stubbe | Open-End | 7.7 | 280 | 40 | 6500 | 4 | 40.9 | 2.75 | 2.14 | 40.3 |

The measurements were made using the same tests as in Example 1. The data demonstrate the increase in mechanical properties obtained by preserving laminar flow substantially throughout the molded liquid crystalline polymer article.

EXAMPLE 3

The process of Example 1 was repeated, except that the liquid crystalline polymer used was a thermotropic wholly aromatic polyester comprising 75 mole percent 4-oxybenzoyl moiety and 25 mole percent 6-oxy-2-naphthoyl moiety. The mechanical properties of the tensile bars produced were measured in accordance with the tests listed in Example 1, and the results are listed in Table III.

TABLE III

| Machine | IV | Mold Type | Melt Temp. (°C.) | Mold Temp. (°C.) | Injection Speed | Tensile Strength (psi × 10³) | Tensile Elongation (%) | Tensile Modulus (psi × 10⁶) | Flex Strength (psi × 10³) | Flex Modulus (psi × 10⁶) | Notched Impact Strength (ft-lb/in) |
|---|---|---|---|---|---|---|---|---|---|---|---|
| Stubbe | 9.8 | Closed-End | 300 | 20 | 4 | 23.7 | 3.09 | 1.42 | 22.0 | 1.40 | 2.53 |
| Stubbe | 9.8 | Open-End | 300 | 20 | 4 | 33.7 | 3.09 | 1.83 | 24.0 | 1.54 | 5.03 |

Again, the data indicate a dramatic increase in mechanical properties of articles molded in accordance with the present invention over articles conventionally molded.

EXAMPLE 4

Tensile bars produced in accordance with the process of Example 3 were subjected to a heat treatment in a nitrogen atmosphere at 300° C. for 62 hours. Following this heat treatment, the mechanical properties of the tensile bars produced in an open-end mold and a conventional mold were measured in accordance with the test listed in Example 1, and the results are given in Table IV.

TABLE IV

| Machine | IV | Mold Type | Melt Temp. (°C.) | Mold Temp. (°C.) | Injection Speed | Tensile Strength (psi × 10³) | Tensile Elongation (%) | Tensile Modulus (psi × 10⁶) |
|---|---|---|---|---|---|---|---|---|
| Stubbe | 9.8 | Closed-End | 300 | 20 | 4 | 33.5 | 3.05 | 1.82 |
| Stubbe | 9.8 | Open-End | 300 | 20 | 4 | 53.1 | 3.32 | 2.25 |
| Stubbe | 9.8 | Open-End | 300 | 20 | 4 | 52.1 | 3.00 | 2.65 |

The data again illustrate the improved properties obtained when articles are molded from liquid crystalline polymer that is allowed to flow laminarly substantially throughout the mold cavity.

EXAMPLE 5

The process of Example 1 was repeated except that the liquid crystalline polymer used was a particularly preferred wholly aromatic poly(ester-amide) or aromatic-aliphatic poly(ester-amide) disclosed in U.S. Pat. No. 4,330,457. The mechanical properties of the tensile bars produced were measured in accordance with the tests listed in Example 1, and the results are listed in Table V.

TABLE V

| Mold Type | Tensile Strength (psi × 10³) | Tensile Elongation (%) | Tensile Modulus (psi × 10⁶) |
|---|---|---|---|
| Closed-End | 22.7 | 0.81 | 3.12 |
| Open-End | 29.1 | 0.95 | 3.65 |

The data demonstrate a marked improvement in tensile properties of liquid crystalline polymer molded in accordance with the present invention as compared to liquid crystalline polymers molded conventionally.

Although the invention has been described with preferred embodiments, it is to be understood that variations and modifications may be employed as will be apparent to those skilled in the art. Such variations and modifications are to be considered within the scope of the claims appended hereto.

I claim:

1. An improved process for injection molding thermotropic liquid crystalline polymer, comprising the steps of:
   a. providing a molten stream of thermotropic liquid crystalline polymer;
   b. injecting said molten stream so as to flow in substantially laminar fashion through an inlet communicating with an upstream end of a cavity in a mold and into said cavity;
   c. allowing a portion of said molten stream to flow through an outlet communicating with said cavity at the downstream thereof, so as to allow molten material to flow out of said cavity while said cavity is being filled in order to minimize rebound molecular wave motion in said molten material within said cavity and substantially preserve said laminar flow;
   d. continuing to allow said molten stream to flow out of said cavity during the entire filling of said cavity with said molten stream so as to continue to minimize rebound molecular wave motion in said molten material within said cavity and substantially preserve said laminar flow; and
   e. solidifying said molten material present in said cavity into a molded article.

2. An improved process for injection molding thermotropic liquid crystalline polymer according to claim 1 wherein said thermotropic liquid crystalline polymer is selected from the group consisting of wholly aromatic polyesters, aromatic-aliphatic polyesters, wholly aromatic poly(ester-amides), aromatic-aliphatic poly(ester-amides), aromatic polyazomethines, aromatic polyester-carbonates, and mixtures of the foregoing.

3. An improved process for injection molding thermotropic liquid crystalline polymer according to claim 1 wherein said thermotropic liquid crystalline polymer is a wholly aromatic polyester.

4. An improved process for injection molding thermotropic liquid crystalline polymer according to claim 1 wherein said thermotropic liquid crystalline polymer is an aromatic poly(ester-amide) or a wholly aromatic-aliphatic poly(ester-amide).

5. An improved process for injection molding thermotropic liquid crystalline polymer according to claim 1 wherein said thermotropic liquid crystalline polymer includes not less than 10 mole percent of recurring units which include a naphthalene moiety.

6. An improved process for injection molding thermotropic liquid crystalline polymer according to claim 1 wherein said thermotropic liquid crystalline polymer includes not less than about 10 mole percent of recurring units which include a naphthalene moiety selected from the group consisting of 6-oxy-2-naphthoyl moiety, a 2,6-dioxynaphthalene moiety, and a 2,6-dicarboxynaphthalene moiety.

7. An improved process for injection molding thermotropic liquid crystalline polymer according to claim 1 wherein said thermotropic liquid crystalline polymer includes not less than 10 mole percent of recurring 6-oxy-2-naphthoyl moiety.

8. An improved process for injection molding thermotropic liquid crystalline polymer according to claim 1 wherein said liquid crystalline polymer is a wholly aromatic polyester which consists essentially of the recurring moieties I and II wherein:

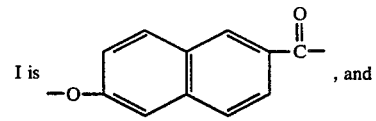, and

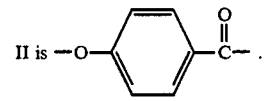.

with said optional substitution if present being selected from the group consisting of an alkyl group of one to four carbon atoms, an alkoxy group of one to four carbon atoms, halogen, phenyl, substituted phenyl, and mixtures of the foregoing, and wherein said polyester comprises approximately 10 to 90 mole percent of moiety I and approximately 10 to 90 mole percent of moiety II.

9. An improved process for injection molding thermotropic liquid crystalline polymer according to claim 8 wherein moiety II is present in a concentration of approximately 60 to 85 mole percent.

10. An improved process for injection molding thermotropic liquid crystalline polymer according to claim 8 wherein moiety II is present in a concentration of approximately 70 to 80 mole percent.

11. An improved process for injection molding thermotropic liquid crystalline polymer according to claim 8 wherein moiety II is present in a concentration of approximately 15 to 35 mole percent.

12. An improved process for injection molding thermotropic liquid crystalline polymer according to claim 8 wherein said moiety II is present in a concentration of approximately 20 to 30 mole percent.

13. An improved process for injection molding thermotropic liquid crystalline polymer according to claim 1 wherein said thermotropic liquid crystalline polymer is a poly(ester-amide) which consists essentially of recurring moieties I, II, III, and optionally, IV wherein:

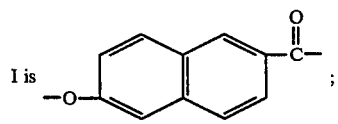;

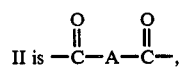, where A is a divalent radical comprising at least one aromatic ring or a divalent trans-1,4-cyclohexylene radical;

III is —Y—Ar—Z—, where AR is a divalent radical comprising at least one aromatic ring, Y is O, NH or NR, and Z is NH or NR, where R is an alkyl group of 1 to 6 carbon atoms or an aryl group; and IV is —O—Ar'—O—, where Ar' is a divalent radical comprising at least one aromatic ring;

wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof, and wherein said poly(ester-amide) comprises approximately 10 to 90 mole percent of moiety I, approximately 5 to 45 mole percent of moiety II, approximately 5 to 45 mole percent of moiety III, and approximately 0 to 40 mole percent of moiety IV.

14. An improved process for injection molding thermotropic liquid crystalline polymer according to claim 13 wherein said moiety II is:

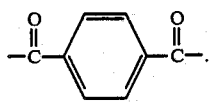

15. An improved process for injection molding thermotropic liquid crystalline polymers according to claim 13 wherein said moiety III is:

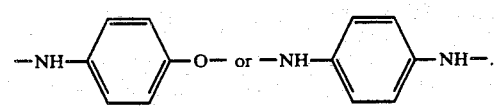

16. An improved process for injection molding thermotropic liquid crystalline polymers according to claim 13 wherein moiety IV is:

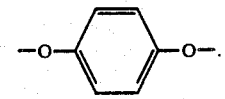

17. An improved process for injection molding thermotropic liquid crystalline polymers according to claim 1 wherein said thermotropic liquid crystalline polymer comprises approximately 75 mole percent 4-oxybenzoyl moiety and approximately 25 mole percent 6-oxy-2-naphthoyl moiety.

18. An improved process for injection molding thermotropic liquid crystalline polymer according to claim 1 wherein at least a portion of said molten stream is allowed to flow through at least one additional outlet communicating with said cavity positioned downstream of said inlet wherein said molten stream is injected.

* * * * *